United States Patent
Huang et al.

(10) Patent No.: US 8,964,120 B2
(45) Date of Patent: Feb. 24, 2015

(54) TELEVISION SYSTEM AND METHOD FOR MANAGING APPLICATIONS THEREIN

(71) Applicant: MStar Semiconductor, Inc., Hsinchu Hsien (TW)

(72) Inventors: Ying-Jui Huang, Hsinchu Hsien (TW); Yi-Wei Huang, Hsinchu Hsien (TW); Wen-Jin Tien, Hsinchu Hsien (TW)

(73) Assignee: MStar Semiconductor, Inc., Hsinchu Hsien (TW)

( * ) Notice: Subject to any disclaimer, the term of this patent is extended or adjusted under 35 U.S.C. 154(b) by 0 days.

(21) Appl. No.: 13/740,398

(22) Filed: Jan. 14, 2013

(65) Prior Publication Data

US 2013/0194499 A1      Aug. 1, 2013

(30) Foreign Application Priority Data

Jan. 30, 2012   (TW) .............................. 101102922 A

(51) Int. Cl.
| | |
|---|---|
| H04N 5/44 | (2011.01) |
| H04N 9/76 | (2006.01) |
| G06F 9/00 | (2006.01) |
| G06F 15/177 | (2006.01) |
| G06F 3/00 | (2006.01) |
| G06F 13/00 | (2006.01) |
| H04N 5/445 | (2011.01) |
| H04N 5/46 | (2006.01) |
| H04N 21/443 | (2011.01) |

(52) U.S. Cl.
CPC ............. *H04N 5/46* (2013.01); *H04N 21/4431* (2013.01)

USPC ................. 348/553; 348/600; 713/2; 725/37; 715/747

(58) Field of Classification Search
CPC ....... H04N 5/46; H04N 21/4431; G06F 9/445
See application file for complete search history.

(56) References Cited

U.S. PATENT DOCUMENTS

| | | | |
|---|---|---|---|
| 6,330,718 B1 * | 12/2001 | Shah-Nazaroff et al. | ........ 725/37 |
| 2004/0155901 A1 * | 8/2004 | McKee et al. | ................. 345/747 |
| 2005/0114644 A1 * | 5/2005 | Chu et al. | ........................... 713/2 |
| 2012/0176546 A1 * | 7/2012 | Yoon | ............................ 348/600 |

FOREIGN PATENT DOCUMENTS

TW           I344603 B         7/2011

OTHER PUBLICATIONS

Taiwan Office Action dated May 12, 2014, 7 pages.

* cited by examiner

*Primary Examiner* — Jefferey Harold
*Assistant Examiner* — Sean Haiem
(74) *Attorney, Agent, or Firm* — Edell, Shapiro & Finnan, LLC

(57) ABSTRACT

A storage medium disposed in a television is provided. A code of a television software system is stored in the storage medium. The television software system includes a first application, a second application and an application management module. The first application has a first function library. The second application has a second function library different from the first function library. The application management module manages the first application and the second application according to the first function library and the second function library, respectively.

13 Claims, 7 Drawing Sheets

TELEVISION SYSTEM AND METHOD FOR MANAGING APPLICATIONS THEREIN

This application claims the benefit of Taiwan application Serial No. 101102922, filed Jan. 30, 2012, the subject matter of which is incorporated herein by reference.

BACKGROUND OF THE INVENTION

1. Field of the Invention

The invention relates in general to a television system, and more particularly, to a technique for integrating heterogeneous operating systems in a television system.

2. Description of the Related Art

As technology products and the Internet both expand and converge, types and quantity of resources including text, graphics, video clips, music and games acquirable by a user through the Internet have expanded at an overwhelmingly fast pace. Therefore, it is a common vision and trend to incorporate Internet resources into household or commercial multimedia systems that can then provide users with more convenient and versatile information entertainment platforms.

A principal part of a multimedia system is the television. Therefore, it is a goal of television system designers to effectively integrate resources and applications acquired through the Internet into a television system.

A key issue in the above integration is that, not all applications acquired through the Internet are compatible to an operating system of the television system. For example, an operating environment of a television system may be Linux, whereas an application acquired through the Internet is only suitable in an Android operating system. The Linux operating system and the Android operating system have a same kernel but different function libraries—the two operating systems are heterogeneous operating systems. In a situation where the operating environment or the application stays unmodified, the application cannot be executed in the television system.

To overcome the foregoing incompatibility issue, a common approach is to modify original source code of television system software, so that the modified source code can adapt to an application compatible to another operating system. However, such approach requiring substantial modifications to the source code of the television system software is not only time and effort consuming but also extremely difficult. Moreover, when further integration of different types of operating systems in the television system is desired, such an approach of modifying the source code of the television system software is almost infeasible. Therefore, flexibility and augmentation possibilities rendered by an Internet television achieved through the foregoing conventional solution are rather unsatisfactory.

SUMMARY OF THE INVENTION

The invention is directed to a television system, in which an application management module is utilized to allow applications of heterogeneous operating systems having different function libraries to be simultaneously displayed in a same display image and utilized without modifying source code.

According to one embodiment of the present invention, a storage medium disposed in a television is provided. Code of a television software system is stored in the storage medium. The television software system comprises a first application, a second application and an application management module. The first application has a first function library. The second application has a second function library different from the first function library. The application management module manages the first application and the second application according to the first function library and the second function library, respectively.

According to another embodiment of the present invention, a method for managing applications is provided. The method is applied to a television software system of the television. The television software system comprises a first application, a second application and an application management module. The method for managing applications comprises steps of: a) receiving a call for a target application; b) determining whether the target application is a focus application in the applications; and c) when the target application is not the focus application, sending a focus withdrawal command to the focus application and sending a focus assigning command to the target application. The above steps (a), (b) and (c) are performed by the application management module.

According to yet another embodiment of the present invention, a method for managing applications is provided. The method is applied to a television software system of the television. The television software system comprises a first application, a second application and an application management module. The method for managing applications comprises steps of: receiving a user command; determining by the application management module whether the user command is a hotkey command; determining by the application management module whether the hotkey command is disabled; when the user command is the hotkey command and the hotkey command is disabled, sending the user command to a focus application in the applications by the application management module; and when the user command is the hotkey command and the hotkey command is not disabled, sending the user command to a target application corresponding to the hotkey command in the applications by the application management module.

For a system designer, the television system structure according to the present invention offers an advantage that a main source code of a main operating system of a television system does not need to undergo substantial modifications for adapting to various operating system having different function libraries. In addition, by defining a common application interface and management mechanism, original source codes of applications compliant to different operating systems can be directly adopted such that a time and effort consuming porting procedure is not needed. For a user, the foregoing television system is capable of accommodating and integrating applications provided by various heterogeneous systems, thereby significantly enhancing augmentation possibilities and convenience.

The above and other aspects of the invention will become better understood with regard to the following detailed description of the preferred but non-limiting embodiments. The following description is made with reference to the accompanying drawings.

DETAILED DESCRIPTION OF THE INVENTION

Figure 1A:
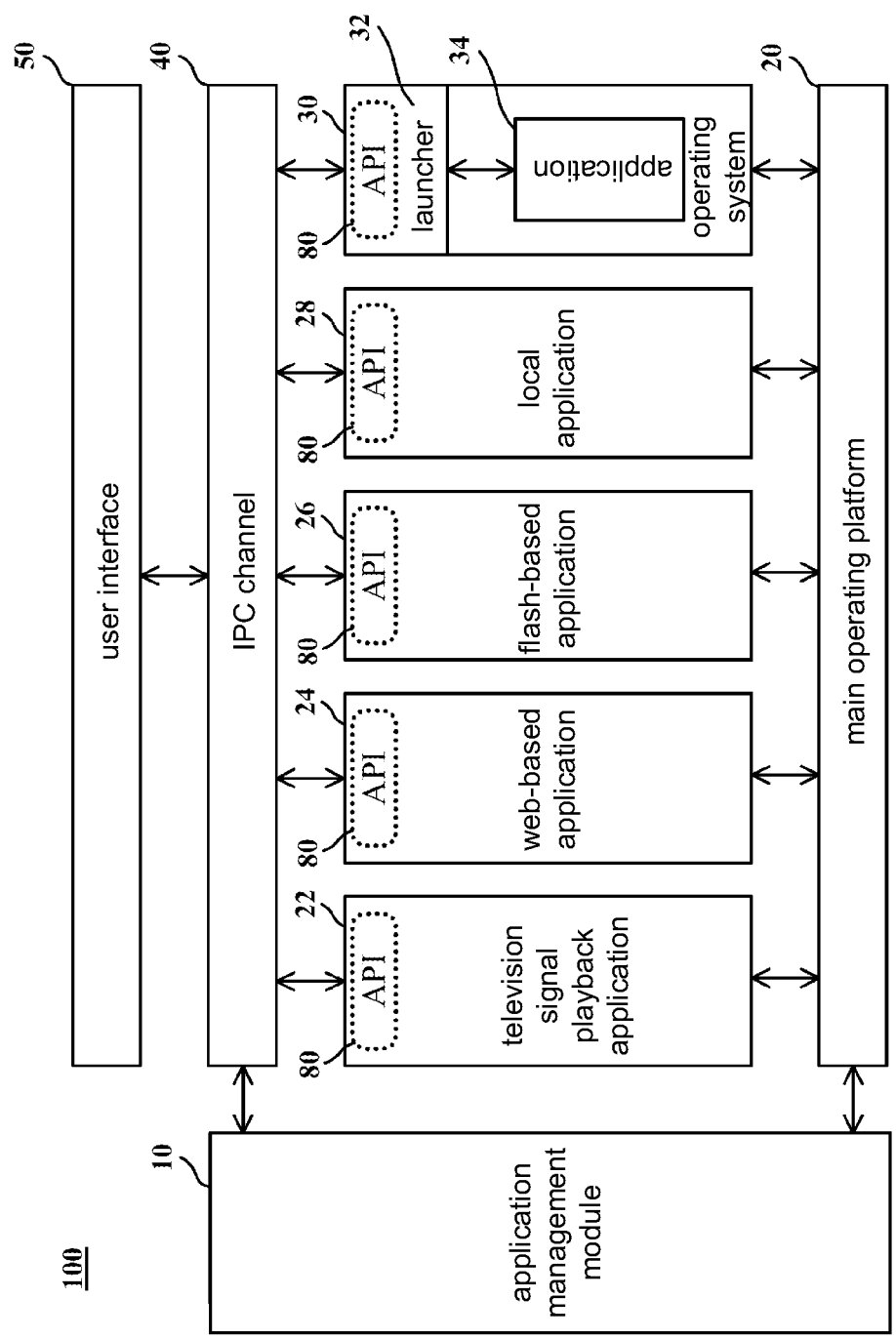
FIG. 1A is a block diagram of a television system according to one embodiment of the present invention.

FIG. 1A shows a structure of a television system according to one embodiment of the present invention. Referring to FIG. 1A, a television system 100 comprises an application management module 10, a main operating platform 20, a television signal playback application 22, a web-based software system application 24, a flash-based software system application 26, a local software system application 28, and an Android operating system 30. In this embodiment, software systems of the applications 22 to 28 and the Android system 30 correspond to a same kernel but have different function libraries, and may thus be regarded as heterogeneous software systems. In the following description, a Linux operating system is taken as an example for the main operating system 20 for explaining the embodiment rather than limiting the present invention.

Figure 1B:
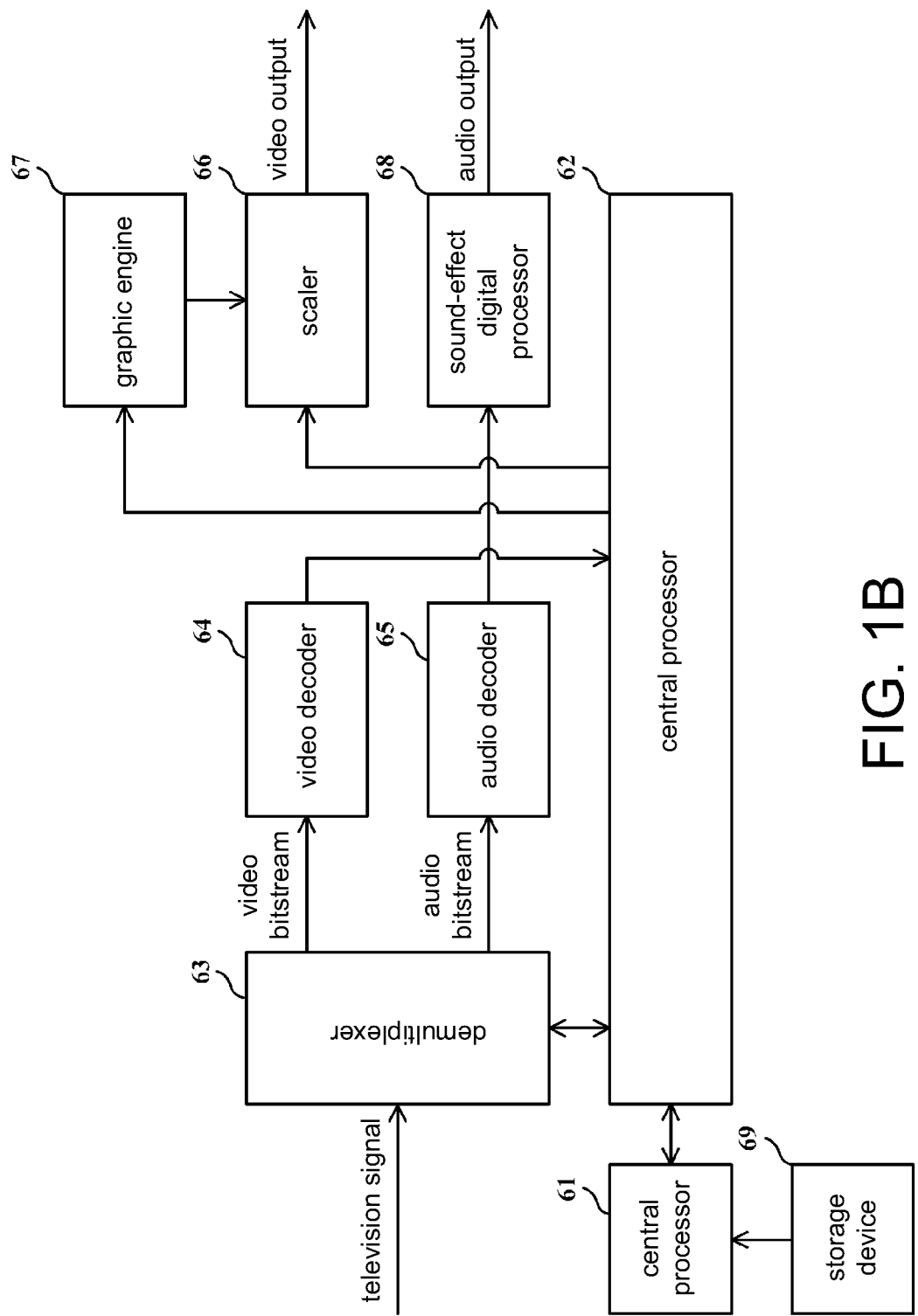
FIG. 1B is a block diagram of a hardware structure of a television system according to one embodiment of the present invention.

FIG. 1B shows an exemplary hardware structure of the television system 100. A central processor 61 executes various software applications in the system. A memory 62 is for temporarily storing data. A demultiplexer 63 decomposes a television signal into a video bitstream and an audio bitstream, and respectively provides the two bitstreams to a video decoder 64 and an audio decoder 65. An output signal from the video decoder 64 is transmitted to the memory 62, and is utilized by a scaler 66 and a graphic engine 67. The graphic engine 67 generates an image of an on-screen display (OSD), a rendered game and/or various applications. The scaler 66 scales a video image to generate a video image suitable for a panel resolution. A sound-effect digital processor 68 receives the output from the audio decoder 65 to further generate various sound effects, e.g., a surround sound effect. A storage device 69 stores codes of the software applications required by the television system. For example, the storage device 69 is a hard disc or a flash memory. The storage device 69 may also be integrated in the memory 62.

In practice, the video decoder 64, the audio decoder 65, the scaler 66, the graphic engine 67 and the sound-effect digital processor 68 in FIG. 1B are system resources that the applications in FIG. 1A can request for use.

The application management module 10 manages applications of multiple heterogeneous software systems of the television system 100 according to function libraries of the software systems. More specifically, the application management module 10 is for managing applications installed in the television system 100. In practice, functions of the television signal playback application 22 are not limited to playing television signals but may also process multimedia signals of other specifications. For example, the web-based application 24 is a web broadcasting playback application, the flash-based application 26 is an online video-playing application, and the local application 28 is a web call application.

The applications of the Android operating system 30 comprise at least one application, i.e., an Android application. For example, the Android application 34 is a game, a browser, a multimedia playback application, an interface widget, or other types of Android applications. In this embodiment, a framework of the Android operating system 30 comprises a launcher 32 capable of communicating with the application management module 10. In practice, the launcher 32 may be modified from an inherent launcher in the Android operating system 30 so that the launcher 32 becomes capable of communicating with the application management module 10.

In this embodiment, the application management module 10 directly communicates with the applications 22 to 28, and communicates with the Android application 34 via the launcher 32. As shown in FIG. 1A, for example, the above communications (e.g., transmitting/receiving a request or a command) are performed through an inter-process communication (IPC) channel 40. Referring to FIG. 1A, the applications 22 to 28 may respectively be regarded as a direct client of the application management module 10, and communicate with the application management module 10 via an application interfaces (API) 80 provided by the application management module 10. For the Android application 34 in the Android operating system 30, the launcher 32 may be regarded as a direct client of the application management module 10, and communicates with the application management module 10 via the API 80 provided by the application management module 10. In contribution to the communication conversion function provided by the launcher 32, the source code need not be modified to adapt to the main operating platform 20 of the television system 100 regardless of the type of the Android application 34. On the other hand, the application management module 10 may also implement the same management mechanism (the same APIs 80) to control the applications 22 to 28 and the Android application 34.

In one embodiment, after the various applications (e.g., the applications 22 to 28 and the Android application 34 in FIG. 1A) are installed in the television system 100, related information (e.g., names, graphics, software systems and execution paths) of the applications are collectively registered to an application definition file. The application management module 10 can learn what applications are installed in the television system 100, and utilize the application definition file as a reference basis for managing the applications.

Further, a directory application compatible to the Linux operating system may be installed in the television system 100. The directory application enumerates (e.g., through texts or graphics) the applications installed in the television system 100 for the reference of a user. For example, after being activated, the directory application can be presented as a graphic interface on a screen of the television system 100 to display all icons of the applications, so that a user is allowed to select an application to be activated or deactivated through a control device such as a remote controller or a mouse. The foregoing application definition file may also serve as an information source for the directory application. For example, the application management module 10 may be designed as to read the current application information from the application definition file each time when the television system 100 is turned on, and then provide the information to the directory application.

Referring to FIG. 1A, the television system 100 comprises a user interface 50. In practice, the television system 100 may concurrently comprise different user control interfaces, e.g., a radio-frequency/infrared controller, panel buttons, a mouse and a keyboard. Thus, for example, the user interface 50 may correspondingly be a remote control signal receiver, a mouse signal receiver, a keyboard/button signal receiver, or an interface integrated with the above receiving functions. In this embodiment, a user command received by the user interface 50 is predetermined to be provided to a focus application in the applications, and is usually an application at an uppermost layer displayed on the screen.

As the user interface 50 receives the user command, the command is transmitted to the application management module 10 via the IPC channel 40 and is then processed by the application management module 10. When the user command is determined as corresponding to one of the applications 22 to 28, the application management module 10 directly forwards the command to the application via the IPC channel 40. In contrast, when the user command corresponds to the Android application 34, the application management module 10 transmits the command to the launcher 32 via the IPC channel 40, and the command is then forwarded to the Android application 34 by the launcher 32.

As previously stated, the application management module 10 is for managing the applications 22 to 28 as well as the application 34. In practice, the so-called management may include activating/terminating an application, transferring a focus permission among applications, and coordinating system resources (e.g., display images, sound effects and networks) for requests and access permission of applications. That is to say, the application management module 10 manages the applications through a focus permission and a resource permission. In practice, since the applications are compliant to different software systems, the applications may respectively have dedicated a focus assigning function, a focus withdrawal function, a resource assigning function, a resource withdrawal function and a termination function. The application management module 10 can communicate with the applications according to the functions of the applications. Examples of the application management module 10 coordinating the activation, termination, focus switching and resource switching of the applications shall be given with reference to FIGS. 2A to 2F.

Figure 2A:
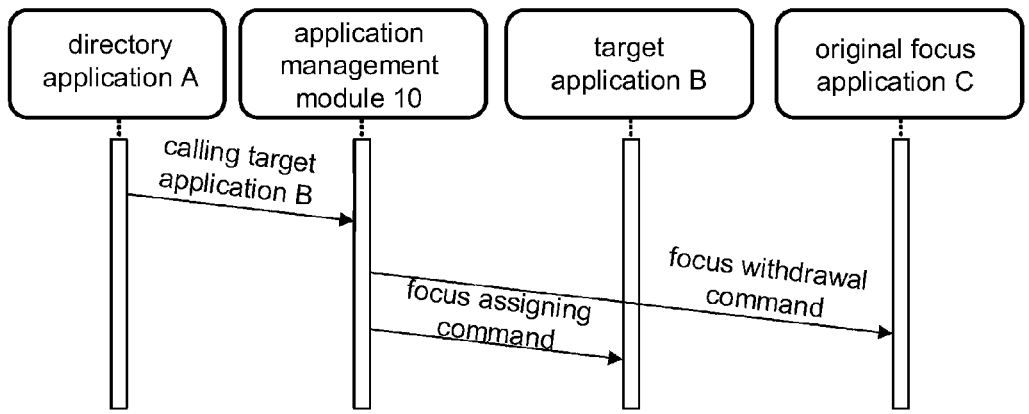
FIGS. 2A to 2F are examples of an application management module coordinating activation, termination, focus switching and resource switching of applications according to one embodiment of the present invention.

Referring to FIG. 2A, in this example, the user selects and activates a target application B via a directory application A. The target application B is originally in an activated state (e.g., being executed in the background) but is not a focus application. The directory application A sends a request for calling the target application B to the application management module 10. Before transferring the focus to the target application B, the application management module 10 first sends a focus withdrawal command to an original focus application C, and sends a focus assigning command to the target application B to accordingly make the target application B as the new target application. In other words, after receiving a call directly to a target application, the application management module 10 first determines whether the target application is a focus application. When the target application is not the focus application, the application management module 10 sends a focus withdrawal command to an original application, and then sends a focus assigning command to the called target application.

Figure 2B:
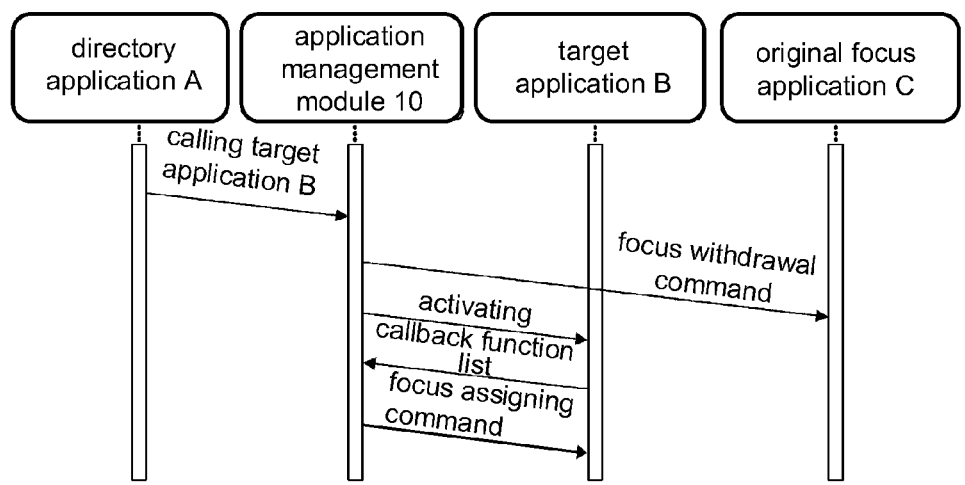

Referring to FIG. 2B, in this example, the user similarly selects and activates the target application B via the directory application A. The target application B is originally in a deactivated state. After receiving the request for calling for the target application B from the directory application A, the application management module 10 first sends a focus withdrawal command to the original focus application C and then activates the target application B. In this example, a callback function list is transmitted to the application management module 10 by the target application B after the target application B is activated. A main function of the callback function list is to inform the application management module 10 which applicable functions and the expected function formats that are to be used for communicating with the target application B, and to simultaneously notify the application management module 10 that the activation procedure is successful. For example, the callback function list comprises a focus assigning function, a focus withdrawal function, a resource assigning function, a resource withdrawal function and a termination function. After receiving the callback function list, the application management module 10 sends a focus assigning command to the target application B according to the focus assigning function.

It is known from the two above examples that, after receiving the request for calling the target application B, the application management module 10 first determines whether the target application B is an application in execution, and the application management module 10 first activates the target application B when the target application B is not the application in execution. It should be noted that, in other embodiments, the foregoing callback mechanism is not necessary for communication between the application management module 10 and the applications. For example, function formats suitable for the applications may be stored in advance in the application management module 10 or in a periphery file. Since operation rules of the applications are different, an advantage of using the callback mechanism is that the application management module 10 is not required to pre-record the functions and operation rules of all the applications of the television system 100.

Figure 2C:
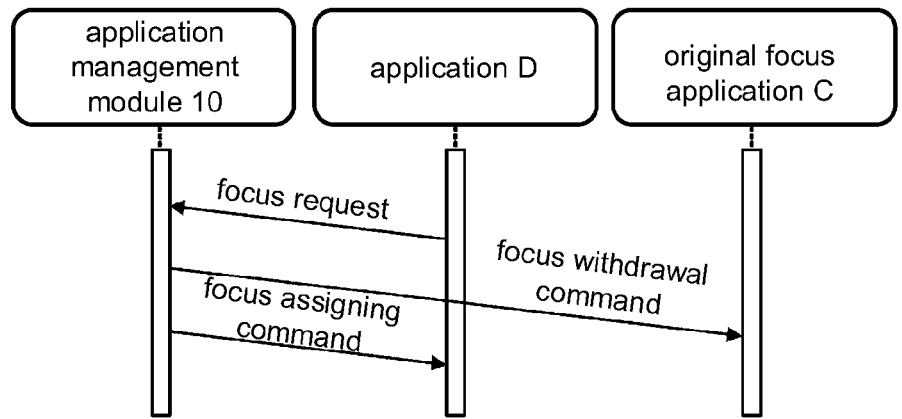

Referring to FIG. 2C, in this example, an application D originally in execution in the background sends a request for becoming a focus application to the application management module 10. Accordingly, the application management module 10 first sends a focus withdrawal command to the original focus application C, and then sends a focus assigning command to the application D. For example, the original focus application C may be the television signal playback application 22, and the application D may be a web call application. In order to catch a user's attention, the web call application may be designed to request the application management module 10 to become a focus application presented at the uppermost layer of the screen upon receiving an incoming call message.

In an actual application, the request for transferring the focus from the original focus application C to the application D may be a forced-on request transmitted by the main operating system 20. For example, the main operating system 20 activates the application D at a specific time point according to a predetermined condition defined by a user, and predetermines that application D becomes the focus application once the application D is activated.

Figure 2D:
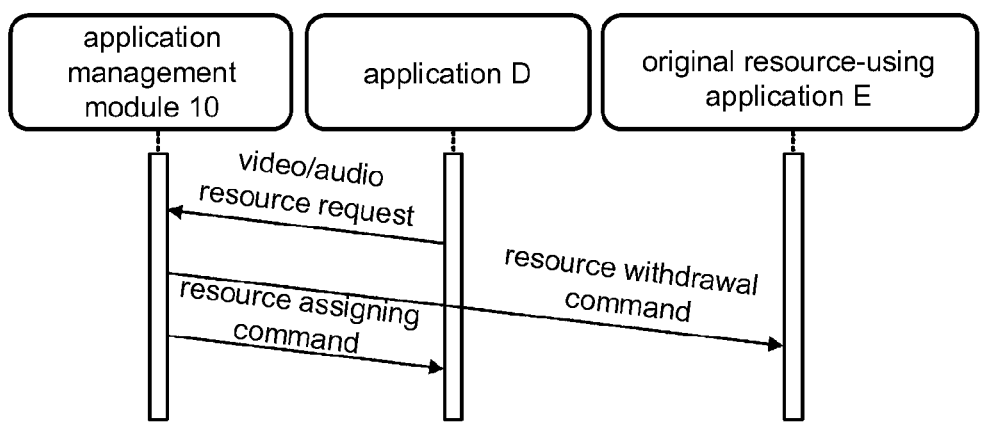

Referring to FIG. 2D, in this example, an approach for coordinating the resource switching among the applications by the application management module 10 shall be explained. For example, the system resources of the television system 100, e.g., the video decoder 64, the audio decoder 65, the scaler 66, the graphic engine 67, and the sound-effect digital processor 68 in FIG. 1B, are shared by all the applications. The application management module 10 may be adopted to coordinate the system resource requirements of the applications. When the application D sends a request for obtaining the audio/video processing resource to the application management module 10, the application management module 10 first sends a resource withdrawal command to an original resource-using application E, and then sends a resource assigning command to the application D. In practice, the application management module 10 may determine to withdraw all or a part of the resource from the original resource-using application E based on actual circumstances. When the application D demands a sole access to the video/audio processing resource, the application management module 10 withdraws all the resource from the original resource-using application E. In addition, when the audio processing resource and the video processing resource of the television system 100 are independently operable, the application management module 10 may respectively assign the two types of resources to different applications.

Figure 2E:
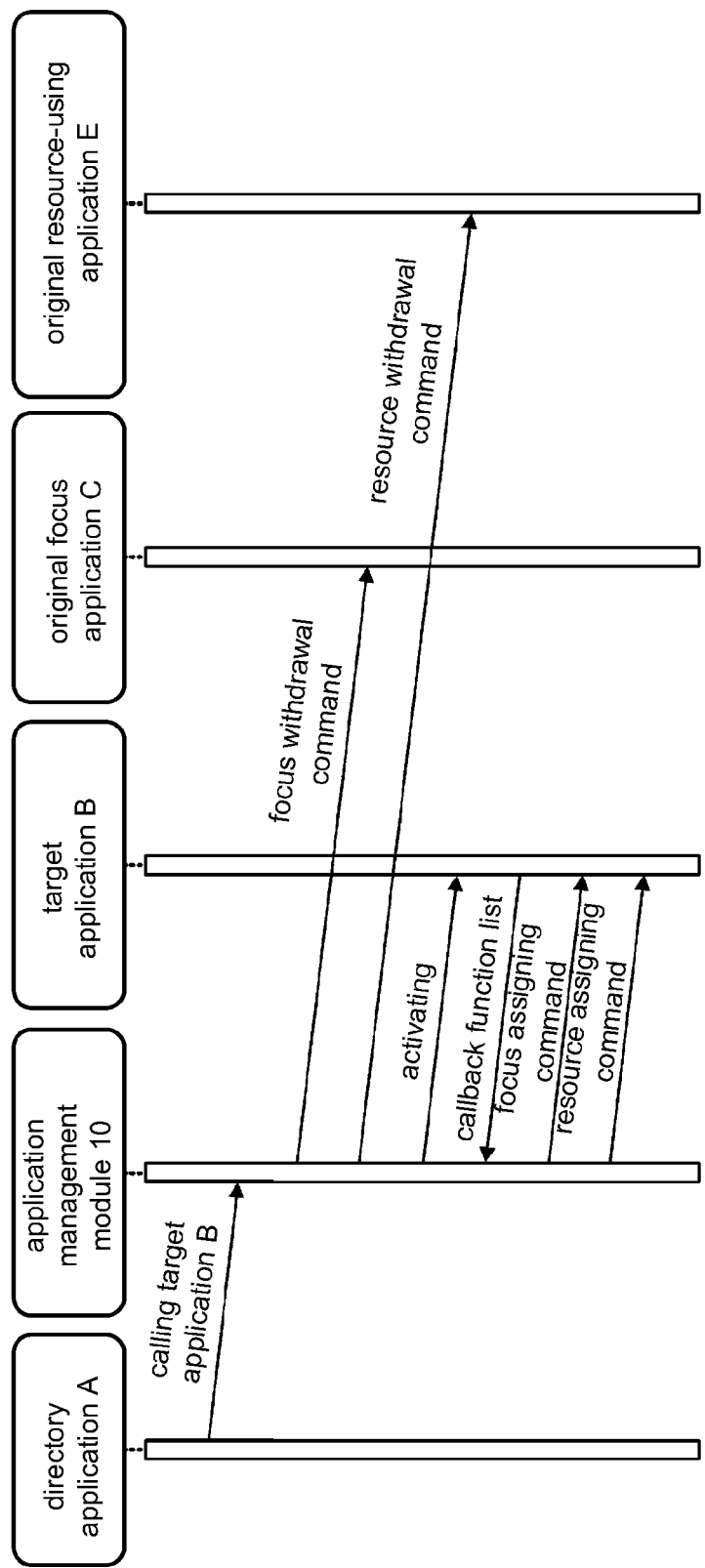

Referring to FIG. 2E, in this example, the user selects and activates the target application B via the directory application A. The target application B is originally in a deactivated state, and the application management module 10 is aware that the video/audio processing resource is required for executing the target application B. After receiving the request for calling the target application B from the directory application A, the application management module 10 first sends a focus withdrawal command to the original focus application C, then sends a resource withdrawal command to the original resource-using application E, and then activates the target application B. As shown in FIG. 2E, after receiving the callback function list provided by the target application B, the application management module 10 sequentially sends a focus assigning command and a resource assigning command to the target application B according to the focus assigning function and the resource assigning function in the callback function list. In practice, the original focus application C and the original resource-using application E may be a same application.

Figure 2F:
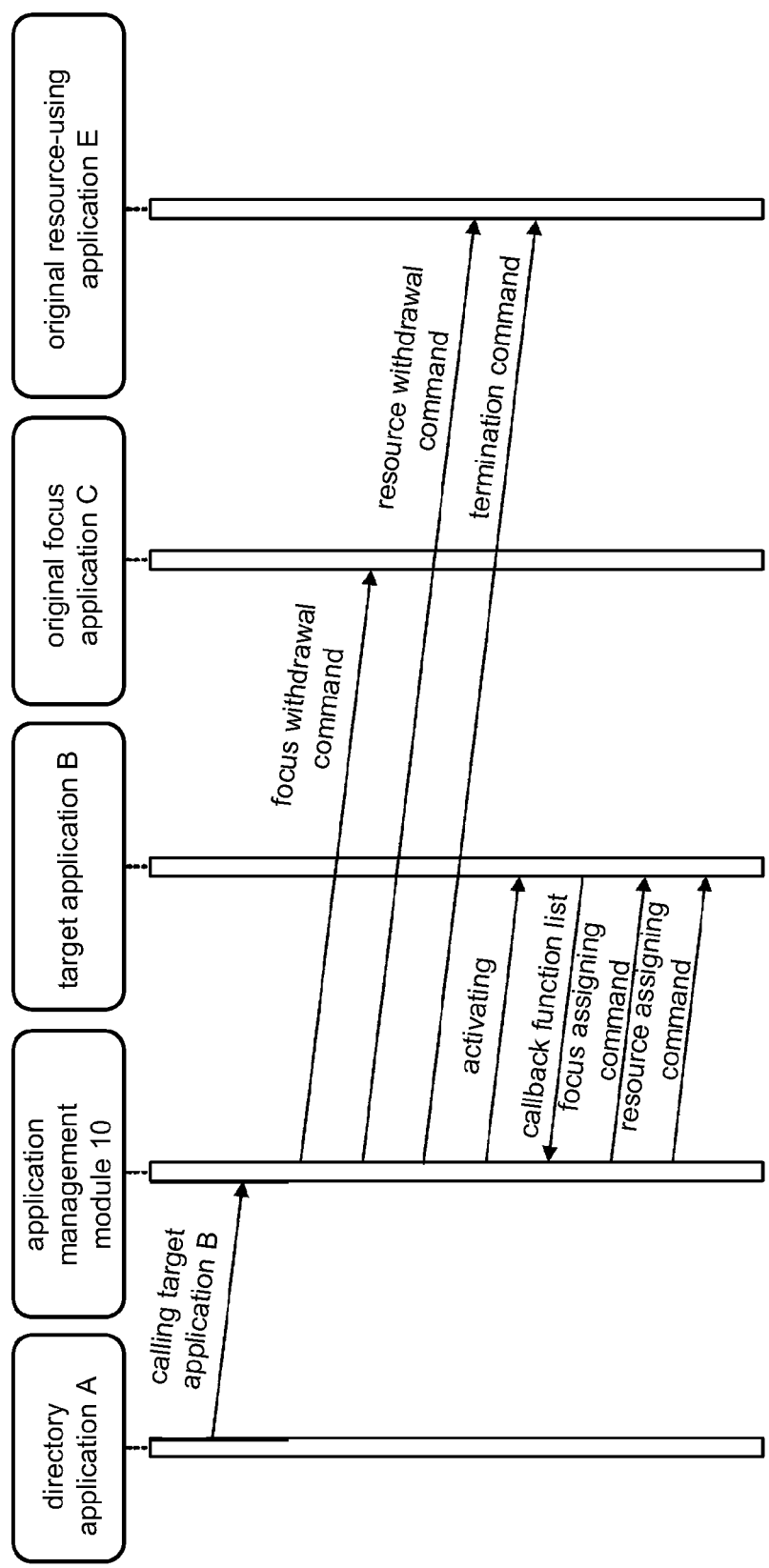

Referring to FIG. 2F, a main difference between this example and the example in FIG. 2E is that, the target application B and the original resource-using application E in this example cannot coexist. Therefore, before activating the target application B, the application management module 10 first sends a termination command to the original resource-using application E. In other words, before activating the target application B, the application management module 10 first determines whether a current application conflicts with the target application B. When the current application conflicts with the target application B, the application management module 10 first sends a termination command to the current application and then activates the target application B. In practice, applications which conflict with the target application B may be recorded in the callback function list provided by the target application B to the application management module 10, or may be recorded in the application definition file.

Figure 3:
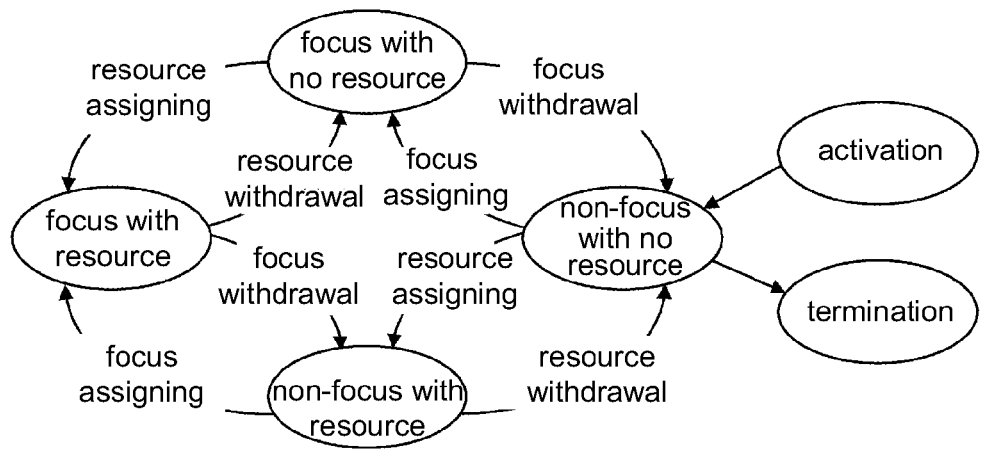
FIG. 3 is an example of state changes of an application in a television system according to one embodiment of the present invention.

Deduced from the above examples, a state of an application of a television system 100 may be concluded as shown in FIG. 3. Before being activated or terminated, an application is in a non-focus with no-resource state. The application management module 10 is in charge of activating or terminating an application, and also handles switching of a focus permission and a resource permission among applications. As previously described, when transmitting or receiving various types of commands from the applications, the application management module 10 directly communicates with the applications 22 to 28, and communicates with the application 34 via the launcher 32. For example, when the television signal playback application 22 needs a video/audio processing resource, the television signal playback application 22 directly sends a request to the application management module 10. When the Android application 34 needs the video/audio processing resource, a request is sent to the application management module 10 via the launcher 32.

In practice, in addition to the directory application A, the user may also send a command for activating, deactivating or adjusting operating parameters of a target application via a remote controller or a hotkey on a keyboard, and the target application is not necessarily a focus application. It should be noted that, when certain applications become a focus application having the focus permission, the applications disable hotkeys of other applications. This situation is to be taken into consideration when the application management module 10 forwards the user command received by the user interface 50.

Figure 4:
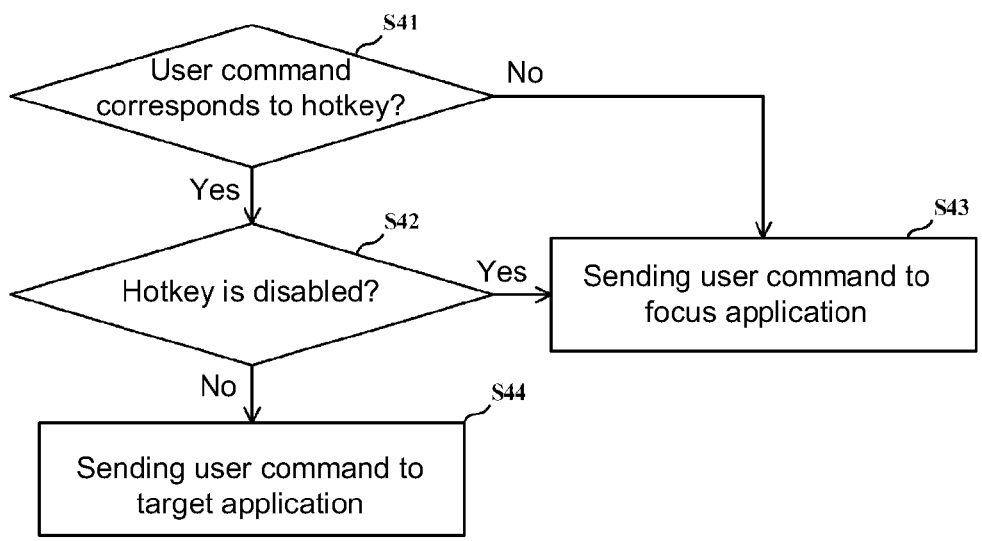
FIG. 4 is a flowchart of an application management module determining to which application the user command is to be transmitted according to one embodiment of the present invention.

FIG. 4 shows a flowchart of the application management module 10 determining to which application the user command is to be transmitted according to one embodiment of the present invention. When receiving a user command transmitted from the user interface 50, the application management module 10 first performs Step S41 to determine whether the command is a hotkey request corresponding to a target application. When a result of Step S41 is affirmative, the application management module 10 performs Step S42 to determine whether the command is a disabled hotkey request (i.e., the hotkey disabled by a current focus application). When a result of Step S42 is negative, the application management module 10 performs Step S44, in which the application management module 10 sends the user command to the target application. Conversely, when the result of Step S41 is negative or when the result of Step S42 is affirmative, the application management module 10 performs Step S43 to send the user command to the focus application.

In practice, the application management module 10 may send the user command to a buffer corresponding to the target application or the focus application. In other words, each application in execution may be designed to correspond to a buffer for storing the user command. An advantage of storing the user command at a client end rather in the application management module 10 is that, overall system performance is maintained by preventing a client from periodically querying the application management module 10 whether there is a new user command.

In one embodiment of the present invention, an activation time of the main operating system 20 is earlier than an activation time of the Android operating system 30, so that an effect of embedding a widget of the Android interface into a television image can be achieved.

Although only one application 34 is depicted in the operating system 30, a plurality of applications compliant to the operating system 30 may be installed in the television system 100. Under such conditions, the application management module 10 may still be designed to regard all the applications compliant to the operating system 30 as one single client, and communicates with the applications via the launcher 32. For example, all focus transferring requests or resource requests coming from the applications compliant to the operating system 30 may be regarded as requests of the launcher 32. According to a response from the application management module 10 received by the launcher 32, the operating system 30 may determine how to assign the focus or how to distribute resources.

It is known from the above description that the operations and management method of the application management module 10 are suitable for the television system 100 comprising a plurality of heterogeneous software systems (e.g., the applications 22 to 28 as well as the Android operating system 30). The heterogeneous software systems may directly communication with the application management module 10 or may communicate with the application management module 10 via the launcher. In contrast, the application management module 10 may also regard the heterogeneous software systems as different clients that can be managed by a same management mechanism (e.g., a same application interface).

For a system designer, the television system structure according to the present invention offers an advantage that the main source code of the main operating system 20 of the television system 100 does not need to undergo substantial modifications for adapting to various software systems having different function libraries. In addition, by defining a common application interface and management mechanism, original source code of the applications compliant to different software systems can be directly adopted such that a time and effort consuming porting procedure is not needed. For a user, the foregoing television system is capable of accommodating and integrating applications provided by various heterogeneous systems, thereby significantly enhancing augmentation possibilities and convenience.

While the invention has been described by way of example and in terms of the preferred embodiments, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A storage medium embedded in a television, the storage medium storing code of a television software system, the television comprising a processor for executing the code of the television software system, the television software system comprising:
    a first application, having a first function library;
    a second application, having a second function library different from the first function library; and
    an application management module, for managing the first application and the second application according to the first function library and the second function library, respectively,
    wherein after the application management module activates a target application in the applications, the target application sends a callback function list to the application management module,
    wherein the call back function list comprises at least one applicable function and at least one function in the function library of the target application, and
    wherein the applicable function comprises at least one of a focus assigning function, a focus withdrawal function, a resource assigning function, a resource withdrawal function and a termination function.

2. The storage medium according to claim 1, wherein the application management module communicates with the first application and the second application via a same application interface.

3. The storage medium according to claim 1, wherein the television software system further comprises:
    a user interface, for receiving a user command which is predetermined to be provided to a focus application in the applications;
    wherein, the application management module is in charge of providing the user command to the focus application.

4. The storage medium according to claim 1, wherein the application management module is in charge of managing the applications to use system resources of the television.

5. The storage medium according to claim 1, wherein related information of the applications is registered to an application definition file, and the application management module manages the applications according to the application definition file.

6. The storage medium according to claim 1, wherein the application management module manages the applications through a focus permission and a resource permission.

7. The storage medium according to claim 1, wherein the first application is compliant to a specific software system, the specific software system comprises a launcher, and the application management module communicates with the first application via the launcher and directly communicates with the second application.

8. A method for managing a plurality of applications, applied to a television software system in a television, the television software system comprising a first application, a second application and an application management module, the method comprising:
    a) receiving a call for a target application;
    b) determining whether the target application is a focus application in the applications; and
    c) when the target application is not the focus application, sending a focus withdrawal command to the focus application and sending a focus assigning command to the target application;
    wherein, steps (a), (b) and (c) are performed by the application management module,
    the method further comprising, after step (a),
    determining by the application management module whether the target application needs a resource, and sending a resource assigning command to the target application when the target application needs the resource, and
    determining by the application management module whether the target application needs a sole access to the resource; when the target application needs the sole access to the resource, sending a resource withdrawal command to a resource-using application and then sending the resource assigning command to the target application.

9. The method according to claim 8, wherein the first application has a first function library, the second application has a second function library different from the first function library, and the application management module manages the first application and the second application according to the first function library and the second function library, respectively.

10. The method according to claim 8, wherein step (c) comprises:
    before the application management module sends the focus assigning command, determining whether the target application is an application in execution; when the target application is not the application in execution, first activating the target application and then sending the focus assigning command to the target application.

11. The method according to claim 8, wherein step (c) comprises:
    before the application management module activates the target application, determining whether a current application conflicts with the target application; when the current application conflicts with the target application, sending a termination command to the current application and then activating the target application.

12. A method for managing a plurality of applications, applied to a television software system in a television, the television software system comprising a first application, a second application and an application management module, the method comprising:
    receiving a user command;
    determining by the application management module whether the user command is a hotkey command;
    determining by the application management module whether the hotkey command is disabled;
    when the user command is the hotkey command and the hotkey command is disabled, sending by the application management module the user command to a focus application in the applications; and when the user command is the hotkey command and the hotkey command is not disabled, sending by the application management module the user command to a target application corresponding to the hotkey command in the applications, wherein the hotkey command is configured to activate, deactivate or adjust operating parameters of the target application, and wherein the target application is not the focus application.

13. The method according to claim 12, wherein the first application has a first function library, the second application has a second function library different from the first function library, and the application management module manages the first application and the second application according to the first function library and the second function library, respectively.

* * * * *